2,946,799
ESTER-LIKE 4-HYDROXY-PIPERIDINE DERIVATIVES

Jany Renz and Jean-Pierre Bourquin, Basel, Switzerland, assignors to Sandoz Ltd., Basel, Switzerland No Drawing. Filed Apr. 24, 1959, Ser. No. 808,557

Claims priority, application Switzerland May 6, 1958

13 Claims. (Cl. 260—294.3)

The present invention relates to new ester-like 4-hydroxypiperidine derivatives having the general formula:

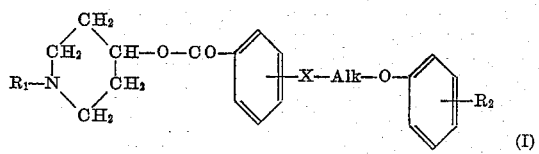

(I)

wherein $R_1$ is a lower alkyl group (e.g., methyl, ethyl, butyl, propyl, isopropyl, etc.), X stands for O or NH, Alk is an alkylene chain containing up to three carbon atoms in a straight chain (e.g., —$CH_2$— or —$CH_2CH_2$— or —$CH_2CH_2CH_2$—), and $R_2$ stands for H, halogen (e.g., Cl or Br) or O-alkyl (wherein the alkyl is lower alkyl).

The aforesaid 4-hydroxypiperidine derivatives of Formula I are prepared, according to the present invention, by reacting a 1-alkyl-4-hydroxypiperidine derivative having the general formula:

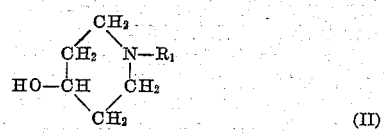

(II)

wherein $R_1$ has the same significance as above, with a functional active benzoic acid derivative of the general formula

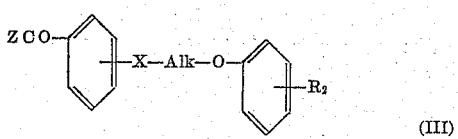

(III)

wherein X, Alk and $R_2$ have the above significances, and Z stands for chlorine, bromine or for an alkoxy group containing one to three carbon atoms.

The process may be effected, for example, in such a way that a 1-alkyl-4-hydroxypiperidine of Formula II is heated at an elevated temperature, preferably 150–200° C., with a substituted benzoic acid alkyl ester of Formula III in the presence of a condensation agent, for example sodium ethylate or metallic sodium, the aliphatic alcohol liberated during the condensation being distilled off. By fractionating under reduced pressure the residue resulting from the condensation the end product having the general Formula I is obtained in purified form.

When the said substituted benzoic acid derivative III used for the acylation of the 1-alkyl-4-hydroxypiperidine II is an acid halide, the reaction may be effected in such a way that the 1-alkyl-4-hydroxypiperidine derivative together with the substituted benzoyl halide is dissolved in an inert organic solvent, for example benzene, toluene or xylene. The solution of the reaction components is allowed to stand at room temperature (about 20 to about 30° C.) and/or at an elevated temperature, for example in a steam bath. Finally the resulting ester present as hydrogen halide, may be set free by addition of an alkali, for example sodium carbonate, and isolated and purified by known methods.

The hitherto unknown piperidine derivatives I prepared according to the present invention may be distilled under reduced pressure without decomposition. They are liquid or solid crystalline bases at room temperature, forming stable acid addition salts with a wide variety of organic and inorganic acids. Thus, physiologically acceptable salts are formed for example with hydrochloric acid, hydrobromic acid, tartaric acid, etc.

The compounds of the invention are characterized by having pharmacodynamic properties which can be made use of in therapy. The free bases and their acid addition salts have a strong local anaesthetic effect, with good local compatibility and low toxicity, which can be made use of in surface anaesthesia as well as in regional anaesthesia. The new compounds are intended to be used for therapeutic purposes, and may be applied topically e.g. in ointment form in a conventional ointment base (petrolatum or the like).

In the following examples, which illustrate the present invention, the melting and boiling points are uncorrected and are stated in degrees Centigrade. Parts are by weight unless otherwise indicated, and the relationship between parts by weight and parts by volume is as that between grams and milliliters.

EXAMPLE 1

*N-(p-chloro)-phenoxy-ethyl-anthranilic acid-(1-methyl-4-piperidyl)-ester*

A mixture of 20 parts of N-(p-chloro)-phenoxy-ethyl-anthranilic acid methyl ester (M.P. 85°, prepared from anthranilic acid methyl ester by alkylation with p-chlorophenyl-β-bromoethyl-ether in dimethylformamide in the presence of anhydrous sodium carbonate), 85 parts of 1-methyl-4-hydroxypiperidine and 0.500 part of sodium ethylate is heated for 2 hours in an oil bath at a temperature of 200°, using a condenser. After cooling, the reaction product is taken up in 200 parts by volume of ether. The solution is washed with water, dried over sodium sulphate and fractionated after removal of the ether. The principal fraction of the base distils at 212–213°/0.07 mm. Hg. The viscous oil, having an intensely yellow color, is taken up in a little benzene and the solution is filtered through a layer of aluminum oxide. The base—N-(p-chloro)-phenoxy-ethyl-anthranilic acid-(1-methyl-4-piperidyl)-ester—is recrystallized from petroleum ether; M.P. 70–73°.

The hydrochloride of the so-obtained base is produced by treating the above solution with a slight excess of alcoholic hydrochloric acid. After evaporation under reduced pressure, the hydrochloride is recrystallized from isopropanol. M.P. 189.0–189.5°.

EXAMPLE 2

*N-(p-methoxy)-phenoxy-ethyl-anthranilic acid-(1-methyl-4-piperidyl)-ester*

A mixture of 9.9 parts of N-(p-methoxy)-phenoxy-ethyl-anthranilic acid methyl ester (M.P. 92–94°, prepared from anthranilic acid methyl ester by alkylation with p-methoxy-phenyl-β-bromoethyl-ether in dimethylformamide in the presence of anhydrous sodium carbonate), 43 parts of 1-methyl-4-hydroxypiperidine and 0.250 part of sodium methylate is heated for 2 hours in an oil bath at a temperature of 200°, using a condenser. Excess methylpiperidinol is distilled off in a water-jet vacuum. The residue is taken up in benzene and extracted with dilute hydrochloric acid. The solution is extracted once more with benzene and made alkaline with aqueous caustic soda solution. The free base is then extracted with benzene. After drying and concentrating the solution it is filtered through a short column of aluminum oxide. The base—N-(p-methoxy)-phenoxy-ethyl-anthranilic acid-(1-methyl-4-piperidyl)-ester—is recrystallized from petroleum ether; fine needles, M.P. 86–88°.

The hydrochloride may be obtained by precipitation of the base dissolved in ether with ethereal hydrochloric acid and subsequent recrystallization from isopropanol. M.P. 174.0–174.5°.

EXAMPLE 3

N-phenoxy-propyl-anthranilic acid-(1-methyl-4-piperidyl)-ester

A mixture of 13.5 parts of N-phenoxy-propyl anthranilic acid methyl ester (B.P. 230°/0.05 mm. Hg, prepared from anthranilic acid methyl ester by alkylation with phenol-γ-bromopropyl-ether in dimethylformamide in the presence of anhydrous sodium carbonate), 57 parts of 1-methyl-4-hydroxypiperidine and 0.335 part of sodium ethylate is heated for 2 hours in an oil bath at a temperature of 200°. Excess methylpiperidinol is distilled off in a water-jet vacuum, the residue is taken up in benzene and extracted with dilute hydrochloric acid. The hydrochloric phase is shaken once more with benzene, separated and made alkaline with aqueous caustic soda solution. The solution is extracted with benzene. Most of the basic solution is then evaporated under reduced pressure filtered through a short column of aluminum oxide. After evaporation of the purified basic solution the base—N-phenoxy-propyl - anthranilic acid - (1 - methyl-4-piperidyl)-ester—crystallizes out and—after recrystallization from petroleum ether—has a M.P. 73–74°.

The hydrochloride is obtained by precipitation of the free base in an ethereal solution with a slight excess of ethereal hydrochloric acid and by recrystallization of the crude salt from isopropanol. M.P. 181.5–182.5°.

EXAMPLE 4

N-phenoxy-ethyl-m-amino-benzoic acid-(1-methyl-4-piperidyl)-ester

A mixture of 10 parts of N-phenoxy-ethyl-m-amino-benzoic acid methyl ester (M.P. 78–79°, prepared from m-amino-benzoic acid methyl ester by alkylation of phenyl-γ-bromoethyl-ether in dimethylformamide in the presence of anhydrous sodium carbonate), 43 parts of 1-methyl-4-hydroxypiperidine and 0.500 part of sodium ethylate is heated for 4 hours in an oil bath at a temperature of 200°, using a condenser. After cooling, the solution is taken up in ether, washed with water, dried over sodium sulphate and distilled. The base—N-phenoxy-ethyl-m-amino-benzoic acid - (1-methyl-4-piperidyl)-ester—passes over as an intensely colored oil at 115–119°/0.015 mm. Hg.

To produce the tartrate, molar amounts of the base are admixed with tartaric acid in an alcoholic solution. The salt is recrystallized from 95 percent alcohol and melts at 155–156°.

EXAMPLE 5 p-(Phenoxy-ethyl-amino)-benzoic acid-(1-methyl-4-piperidyl)-ester

A mixture of 50.0 parts of p-(phenoxy-ethyl-amino)-benzoic acid ethyl ester (M.P. 108–110°, prepared from p-amino-benzoic acid ethyl ester by alkylation with bromoethyl-phenyl-ether in n-butanol in the presence of potash), 81.0 parts of 1-methyl-4-hydroxypiperidine (B.P. 200°) and 4.0 parts of powdered sodium ethylate is heated for 2 hours in an oil bath at a temperature of 200°, using a condenser. When the distillation of ethanol has ceased, cooling, digestion with 500 parts by volume of acetone and filtration are effected. The filtrate is evaporated and the residue distilled. After removal of excess 1-methyl-4-hydroxypiperidine at 10 mm. Hg, the first runnings, distilling over at up to 210° in a vacuum of below 0.1 mm. Hg, are separated in a high vacuum. The principal fraction, distilling over at 210–230° at the same pressure, is collected. Recrystallization of this fraction from ethyl acetate produces analytically pure p-(phenoxy-ethyl-amino)-benzoic acid - (1-methyl-4-piperidyl)-ester having a M.P. of 130–132°.

To prepare the fumarate, a solution of 10.0 parts of the free base dissolved in 50 parts by volume of absolute ethanol, is treated with a solution of 3.5 parts of maleic acid in 50 parts of absolute ethanol. 200 parts by volume of ether are added and the fumarate, which crystallizes out, is recrystallized from 100 parts by volume of absolute ethanol and 300 parts by volume of ether. Analytically pure fumarate of p-(phenoxy-ethyl-amino)-benzoic acid-(1-methyl-4-piperidyl)-ester has a M.P. of 139–141° (with decomposition).

EXAMPLE 6

N-phenoxy-ethyl-anthranilic acid-(1-methyl-4-piperidyl)-ester

A mixture of 50.0 parts of N-phenoxy-ethyl-anthranilic acid ethyl ester (M.P. 65–70°, prepared from anthranilic acid ethyl ester and bromoethyl-phenyl-ether dissolved in n-butanol in the presence of potash), 81.0 parts of 1-methyl-4-hydroxy-piperidine (B.P. 200°) and 4.0 parts of powdered sodium ethylate is heated for 2 hours in an oil bath at a temperature of 200°, using a condenser. When the distillation of the ethanol has ceased, cooling, digestion with 500 parts by volume of acetone and filtration are effected. The filtrate is evaporated and the residue distilled. After removal of excess 1-methyl-4-hydroxy-piperidine at 10 mm. Hg, the first runnings, distilling over at up to 205° in a vacuum of below 0.04 mm. Hg, are separated in such high vacuum. The principal fraction, distilling over at 205–215° at the same pressure, is collected. Recrystallization of this fraction from petroleum ether (40–60°) produces analytically pure N-phenoxy-ethyl-anthranilic acid - (1 - methyl-4-piperidyl)-ester having an M.P. of 87–89°.

To prepare the fumarate, a solution of 15.0 parts of the free base dissolved in 50 parts by volume of absolute ethanol is treated with a solution of 5.15 parts of fumaric acid in 250 parts by volume of absolute ethanol. The fumarate, which crystallizes out, is recrystallized from 600 parts by volume of boiling absolute ethanol. Analytically pure fumarate of N-phenoxy-ethyl-anthranilic acid-(1-methyl-4-piperidyl)-ester has an M.P of 182–184°.

The monohydrochloride is prepared by treating a solution of 10.0 parts of the free base in 50 parts by volume of absolute ethanol with ethanolic hydrochloric acid until acid to Congo red. Recrystallization from 60 parts by volume of boiling absolute ethanol produces analytically pure N-phenoxy-ethyl-anthranilic acid-(1-methyl-4-piperidyl)-ester hydrochloride with an M.P. of 184–186° (sintering from 175°).

EXAMPLE 7

O-phenoxy-ethyl-salicylic acid-(1-methyl-4-piperidyl)-ester

A mixture of 50.0 parts of O-phenoxy-ethyl-salicylic acid methyl ester (M.P. 84–86°, prepared by etherification of salicylic acid methyl ester with bromoethyl-phenyl-ether in acetone in the presence of potash), 85.0 parts of 1-methyl-4-hydroxypiperidine (B.P. 200°) and 4.0 parts of powdered sodium ethylate is heated for 2 hours in an oil bath at a temperature of 200°, using a condenser. When the distillation of the methanol has ceased, cooling, digestion with 500 parts by volume of acetone and filtration are effected. The filtrate is evaporated and the residue distilled. After removal of excess 1-methyl-4-hydroxypiperidine at 10 mm. Hg, the first runnings, distilling over at up to 192° in a vacuum of below 0.01 mm. Hg, are separated in such high vacuum. The principal fraction, distilling over at 192–200° at the same pressure, is collected. Analytically pure O-phenoxy-ethyl-salicylic acid-(1-methyl-4-piperidyl)-ester thus obtained has a B.P. of 196°/0.01 mm. Hg.

To prepare the fumarate, 37.1 parts of the free base and 12.75 parts of fumaric acid are dissolved in 150 parts by volume of boiling absolute ethanol. The mixture is then filtered and the fumarate, which crystallizes out, is recrystallized from 1300 parts by volume of boiling absolute ethanol. Analytically pure fumarate of O-phenoxy-ethyl-salicylic acid-(1-methyl-4-piperidyl)-ester thus obtained has a M.P. of 163–165°.

EXAMPLE 8

*N-phenoxy-ethyl anthranilic acid-(1-isopropyl-4-piperidyl)-ester*

N-phenoxy-ethyl anthranilic acid-(1-isoproyl-4-piperidyl)-ester may be obtained from N-phenoxy-ethyl anthranilic acid ethyl ester and 1-isopropyl-4-hydroxy-piperidine (B.P. 104–104.5°/11 mm. Hg) using the same procedure as in Example 6. The so-obtained free base has a M.P. of 106–107°.

Fumarate: M.P. 168–170°. Hydrochloride: M.P. 175–177°.

Having thus disclosed the invention, what is claimed is:
1. A member selected from the group consisting of compounds of the formula

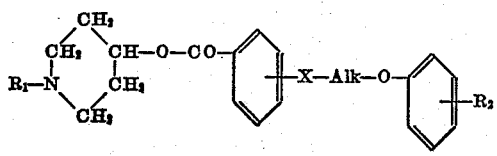

and therapeutically-useful salts thereof with acids, wherein $R_1$ stands for a lower alkyl group, X is a member selected from the group consisting of O and NH, Alk is an alkylene chain containing up to three carbon atoms in a straight chain, and $R_2$ is a member selected from the group consisting of H, halogen and lower alkoxy groups.

2. A compound of the formula

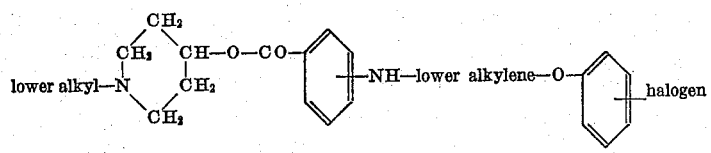

3. A compound of the formula

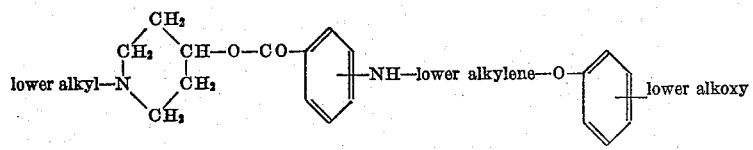

4. A compound of the formula

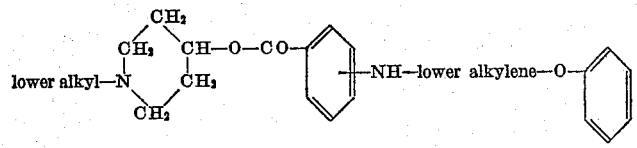

5. A compound of the formula

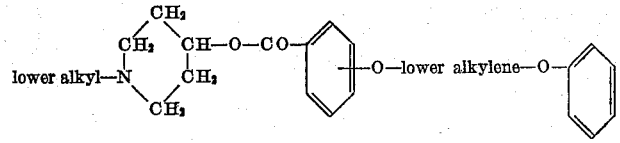

6. N-(p-chloro)-phenoxy-ethyl-anthranilic acid-(1-methyl-4-piperidyl)-ester.
7. N-(p-methoxy)-phenoxy-ethyl-anthranilic acid-(1-methyl-4-piperidyl)-ester.
8. N-phenoxy-propyl-anthranilic acid-(1-methyl-4-piperidyl)-ester.
9. N-phenoxy-ethyl-m-amina-benzoic acid-(1-methyl-4-piperidyl)-ester.
10. P-(phenoxy-ethyl-amino)-benzoic acid-(1-methyl-4-piperidyl)-ester.
11. N-phenoxy-ethyl-anthranilic acid-(1-methyl-4-piperidyl)-ester.
12. O-phenoxy-ethyl-salicylic acid-(1-methyl-4-piperidyl)-ester.
13. N-phenoxy-ethyl-anthranilic acid-(1-isopropyl-4-piperidyl)-ester.

No references cited.